Dec. 6, 1955

S. G. MEADOWS ET AL

MEANS FOR RECORDING THE READINGS OF AN INSTRUMENT OR GROUP OF INSTRUMENTS 2,726,130

Filed June 28, 1951

6 Sheets-Sheet 1

Inventors
Stanley George Meadows
Robert Norman Saxby
By
Richard Lovell Cleaver
Attorney Inventors
Stanley George Meadows
Robert Norman Sayley
By
Richard Lovell Cleaver
Attorney Inventors
Stanley George Meadows
Robert Norman Sarly
By
Richard Lovell Cleaver
Attorney Inventors
Stanley George Meadows
Robert Norman Saxby
By
Richard Lovell Cleaver
Attorney Inventors
Stanley George Meadows
Robert Norman Lapley
By
Richard Lovell Cleaver
Attorney Inventors
Stanley George Meadows
Robert Norman Sayley
By
Richard Lovell Cleaver
Attorney United States Patent Office 2,726,130

Patented Dec. 6, 1955

2,726,130

MEANS FOR RECORDING THE READINGS OF AN INSTRUMENT OR GROUP OF INSTRUMENTS

Stanley George Meadows, Hornchurch, and Robert Norman Saxby, Mossley Hill, Liverpool, England, assignors to Southern United Telephone Cables Limited, Dagenham Dock, Essex, England Application June 28, 1951, Serial No. 234,134

11 Claims. (Cl. 346—78)

This invention is concerned with the recording of readings of an instrument or a group of instruments. It does not deal with recordings by means of marking points or lines on a chart, but provides for the printing of the readings by means of type on a record sheet. The result attained in this recording is the production of one or more columns of figures, with or without signs, typed in appropriate positions on the record sheet. In some cases a sequence of such results in different positions across the sheet is produced.

The device by which the record is printed may be a modified typewriter. Such an arrangement has the advantage that ordinary hand operation of the typing keys to add notes or comments at will on the record sheet may be used. The essential of the typing device is that it contains a number of type-operating means, each adapted to print one or more numerals or signs and each under electro-mechanical control, in combination with a carrier for the record sheet and means for producing relative movement between the sheet and the type, that is moving the position of the typing step by step across the sheet (spacing movement).

The electro-mechanical control device may consist of an electromagnet the armature of which is attached to the lever of the type so as to pull this downward when the magnet is excited, thus giving an effect equivalent to the action of the finger on the key.

The apparatus embodying the invention also comprises a multi-point switch or group of switches which is set by hand or otherwise for each of the readings to be recorded. The reading is not read or recorded by the operator (if any) but after the setting has been fixed the typing device proceeds to print the reading on the record sheet.

The term "reading" is used herein as indicating a value to which an instrument, or group of instruments, is set either by hand operation or otherwise. It is possible that the instrument may be such that a visual indication is given so that an actual reading can be taken. In many cases, however, this will not be so and it is not necessary for the operation of the invention.

The following examples of recordings to which the invention may be applied will illustrate its possibilities.

The first example is in the testing of the groups of wires (quads) of a telephone cable for out-of-balance and mutual capacities. As is well known, this requires for each group of wires the taking of a number of readings in appropriate sequence representing the out-of-balance and mutual capacities between different members of the group and between such members and other parts of the cable. For one group there may be, for instance, eleven readings, each consisting of a sign followed by one or more numerals. The readings are obtained by adjusting a capacitor or group of capacitors to produce a balance in a bridge: the adjustment may be on either the positive or negative side of the zero position. In making the record the figures may be set in eleven groups in a line across a sheet of paper. At the beginning of each line, a symbol indicating the identity of the group may be typed by hand or automatically: the rest of the entry for the group is made by the apparatus. As each setting of the multi-point switch or group is made the out-of-balance recording apparatus is put into motion and the appropriate reading is typed on the record sheet in the appropriate column.

In the second example a reading of an instrument, for instance, a voltmeter or a pressure gauge at fixed time intervals, is recorded. This is done by bringing, at the appropriate intervals, a multi-point switch into the position at which its pointer coincides with the pointer of the instrument, whereupon the typing device is made to type a reading on the record sheet in a position appropriate for the time at which the reading is taken.

In accordance with the invention circuit connections are made by the multi-point switch or group for one or more columns of figures with or without signs and these connections are arranged to co-act with other connections on a position switch actuated by the spacing movement of the carrier relative to the type on the typing device. In this way a circuit is established for each pair of associated positions of the multi-point switch and the position switch for the actuation of a type member appropriate for printing a part of the reading at the position of typing on the record sheet.

The position switch on the typing device consists of a wiper moving with the carriage and a line of contacts mounted on the type-carrying part of the device, one contact being provided for each of a number of typing positions across the record sheet.

The multi-point switch may, and commonly will, be of the rotary type, having an arm carrying at its extremity one or more wipers, each co-operating with a line of contacts forming a level in a bank of contacts arranged in an arc of a circle. More than one of such rotary switches may be used to set the complete reading. Such a rotary arrangement is particularly applicable where the setting is arrived at by a balancing operation resulting from switching elements into and out of circuit or adjusting the value of a variable element such as a capacitor or resistor. The rotary switch, or group, may be hand or mechanically operated and may be connected with the capacitor, resistor or other circuit adjusting device, either directly or through mechanical gearing.

The invention is described further with reference to the recording on a typewriter in sequence the individual values of eleven capacities existing in a telephone cable, the arrangement being illustrated in the accompanying drawings wherein—

Figures *6a*, *6b*, *6c*, and *6d* together illustrate the electrical circuit of the apparatus.

The typewriter illustrated is of a well-known form and for the present purpose it is necessary to refer only to the spacer operating means, the main type operating bars, and the carriage. To the back of the carriage 1 is attached a group of three wiper contacts W1, W2, and W3 mounted one above another in an insulating block 2. Each contact is slightly narrower than the distance traversed by the carriage 1 during each spacing movement. Fixed to the back of the machine is an insulating block 3 extending over the complete width of the machine and carrying three horizontal rows T1, T2, T3 of fixed contacts. These rows T1, T2, T3 of fixed contacts are further described hereinafter and are engaged by the three wiper contacts W1, W2, and W3.

Figure 1:
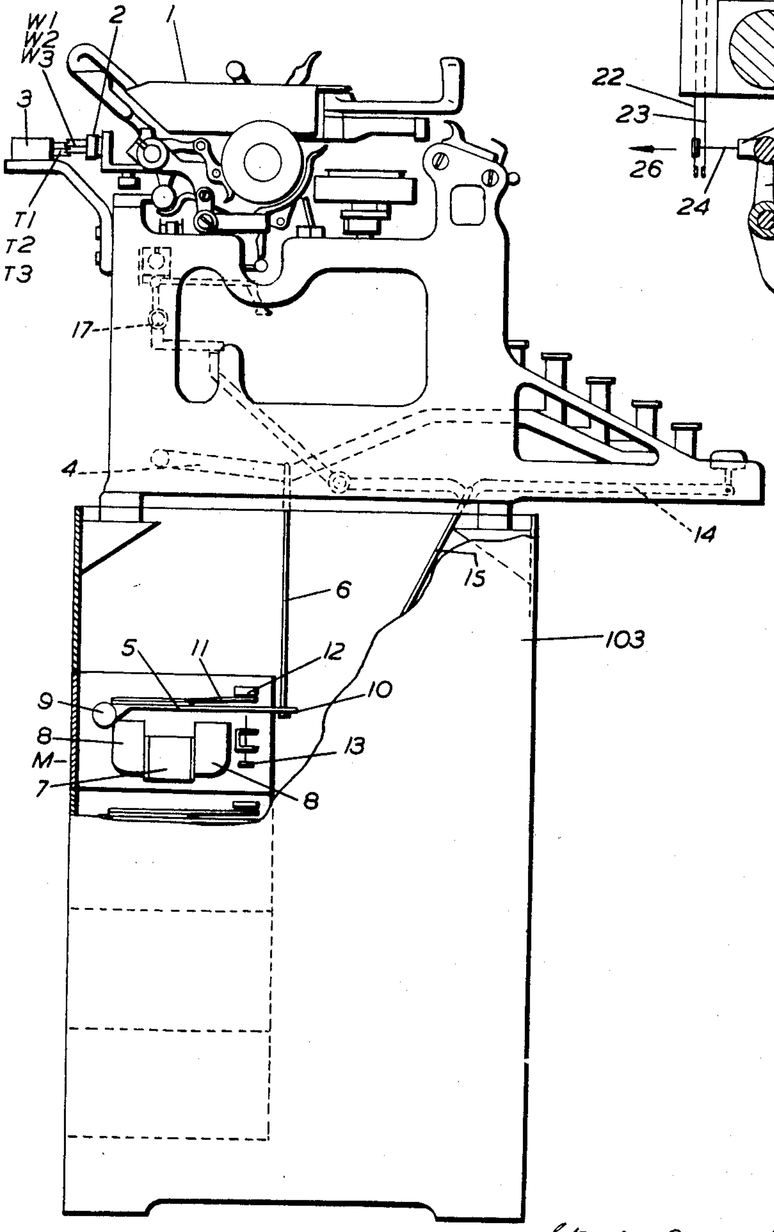
Figure 1 is a view of a typewriter modified for use in in accordance with the invention.

The typewriter is supported on a frame 103 in which there are mounted a number of electro-mechanical relays, one (M) of which is illustrated in some detail. The number of these relays M corresponds to the number of type levers and the spacer bar which are required to be automatically controlled. In the arrangement now under consideration fifteen type levers are under electro-magnetic control. One (4) of these is indicated in Figure 1 and is shown attached to the free end of the relay armature 5 by means of a vertical connecting rod 6. The electro-magnetic relay M comprises the coil 7, the poles 8, and the armature 5, the latter pivoted at one end 9 and movable at the other end 10 where it is attached to the connecting rod 6. The armature 5 is provided with a blade spring 11 which engages a buffer 12 when the armature is released. The extent of the operative movement of the armature 5 is controlled by means of an adjusting screw 13. It will be seen from the drawing that when the coil 7 is made alive the free end 10 of the armature 5 will be drawn downwards, thus depressing the type lever 4 to print a character in the usual manner.

Figure 2:
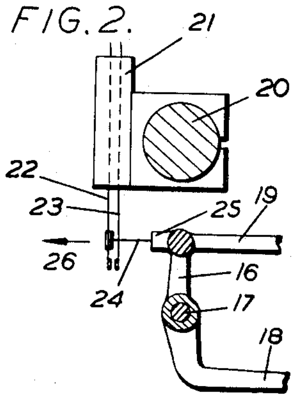
Figure 2 is a detail of the typewriter spacer mechanism.

The spacer bar 14 is similarly controlled from another relay by another connecting rod 15. The traverse of the carriage 1 is effected by the usual escapement mechanism. Part of the linkage operating this mechanism is shown in Figure 2. It consists of a substantially vertical lever 16 pivoted at a point 17 midway along its length. From the lower end of this lever 16 there extends a link 18 which connects it with the spacer bar 14. From the upper end of the lever another link 19 connects it with the striker bar (not shown) through which the escapement mechanism is operated when a character is printed.

It is convenient to use this escapement mechanism to interrupt the electrical circuit when a character is printed. For this purpose there is mounted on a fixed bar 20 of the typewriter an insulating block 21 carrying two switch blades 22, 23 which are normally in contact. One blade 22 is provided with a projection 24 which extends freely through an aperture in the other blade 22, the end of the projection 24 being in such a position that it will be engaged by the upper end 25 of the link 16 when the spacer mechanism is operated. The pressure of the link 16, operating in the direction of the arrow 26, against the projection 24 causes the contact blades 22 and 23 to separate momentarily. When the spacer mechanism returns, during which movement the carriage 1 is moved through one space by the usual arrangement, the blades 22 and 23 again come into contact.

Figure 6A:
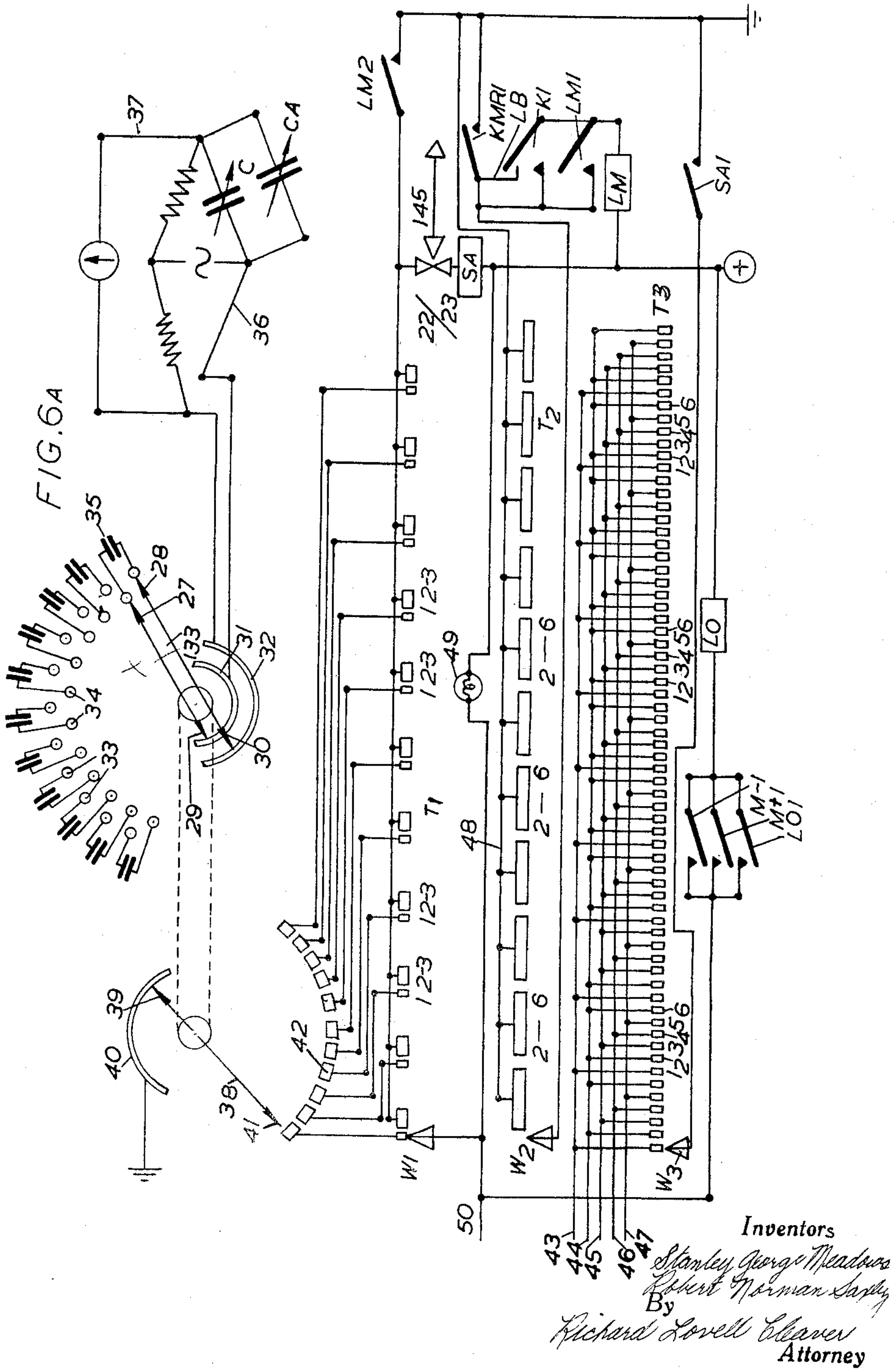

In Figure 6*a* there is shown a selector switch with a rotatable arm 133 having two contact wipers at each end. The wipers 29, 30 at one end engage with two fixed contacts 31, 32 extending over the range of movement of the wipers. The wipers 27, 28 at the other end are adapted to engage two rows 33, 34 of fixed contacts arranged in pairs, each pair being permanently connected with a capacity 35 which is required to be measured and each pair being connectible by means of the wipers 27, 28, 29, and 30 and rotatable arm 133 with the two fixed contacts 31, 32. The fixed contacts 31, 32 are associated with one arm 36 of a capacity measuring bridge 37, in the other arm of which there is a variable condenser C, the adjustment of which will give, usually on a visible scale, an indication of the value of the capacity 35 connected in the arm 36. The capacity bridge 37 is illustrated merely diagrammatically as are the eleven unknown capacities 35. For the purpose of this invention it is not necessary to illustrate the elaborate circuit required for testing a telephone cable.

Mechanically associated with the rotatable arm 133 is a similar arm 38 of another selector switch. For practical purposes these two arms may be mounted on a common shaft. The second arm 38 is provided with a wiper contact at each end, one wiper 39 engaging a fixed contact 40 extending over the range of movement and the other wiper 41 being adapted to engage one at a time a series 42 of eleven fixed contacts. The first mentioned contact 40 is permanently earthed, as is also one terminal of the D. C. source of supply from which current is derived for the operation of the various relays of the circuit.

The apparatus is designed to print, for each complete sweep of the first selector switch arm 133, a row of eleven groups of figures. Each group constitutes a record of the reading of the variable condenser C and comprises six figures, printed by six operations of the typewriter in sequence. For the present purpose, the movement of the carriage 1 through one step without printing a symbol is referred to as "printing a space." The completion of a row of readings thus involves sixty-six operative positions of the carriage 1, and the lower fixed level T3 of contacts at the back of the typewriter contains a corresponding number (i. e. sixty-six) of contacts in the appropriate positions. The relative positions of the contact level T3 and the corresponding wiper W3 is such that W3 engages the first contact of the first group when the carriage 1 is in position for printing the first character in the first record, i. e. as shown in Figure 6*a*. For reference the contacts in several of the groups in level T3 are numbered 1 to 6 in Figure 6*a* only. When a circuit is made through contact 1 of any group, the circuit is completed to print a sign, either positive or negative, or under certain circumstances a space; through contact 2 a space is always printed; through contact 3 a numeral or, in the certain circumstances above mentioned, a sign; through contact 4 a numeral; through contact 5 a cipher; and through contact 6 a space. In some instances contact 3 may cause to be printed two figures, provided side by side on the same type lever, one of the figures occupying the space obtained with contact 2. The contacts in this level T3 are permanently connected in the manner illustrated in Figure 6*a*. Contacts 1, 1 are joined to lead 43; contacts 2, 2 and 6, 6 to the same lead 44, since each print a space; contacts 3, 3 to lead 45, contacts 4, 4 to lead 46; and contacts 5, 5 to lead 47. The wiper W3 of this level is connected to the earth terminal over switch SA1.

The remaining levels T1 and T2 also comprise each eleven sets of contacts. In level T2 each set consists of a single contact 2—6, which extends over the positions 2, 3, 4, 5 and 6 of the corresponding group in level T1. The first position in each case in level T2 is left blank. All the contacts in level T2 are permanently connected through a lead 48 with the earth terminal. The corresponding wiper W2 is adapted to be connected to earth over a switch KMR1. The wiper W2 is also adapted to be joined to the other supply terminal, indicated by a positive sign in a circle, over two switches K1 and LM1 in parallel, and a relay LM. In level T1 each group of contacts comprises two members. In each case the first member 1, corresponds in position with contact 1 in level T3, and the second member 2—3 extends over the positions corresponding with contacts 2 and 3 in T3. There are no contacts in level T1 to correspond with contacts 4 to 6 in level T3. The members 1 in level T1 are individually connected to one of the contacts 42 in the second selector switch, so that all members 1 are connected in turn to earth as the switch wiper 41 moves over the switch contacts 42. The members 2—3 are all permanently joined together, being connected to earth over a switch LM2 and to the supply terminal over a switch 22/23 and a relay SA. The switch 22/23 is the one represented in Figure 2 by the contact blades 22 and 23. It is normally closed, being opened for a short period at each operation of the typewriter by the escapement mechanism (145 in Figure 6*a*). The wiper W1 is permanently connected over a pilot light 49 to the supply terminal, and also to that terminal over three switches, M−1, M+1, and LO1 in parallel and a relay LO. Wiper W1 is also connected to a lead 50.

Figure 3:
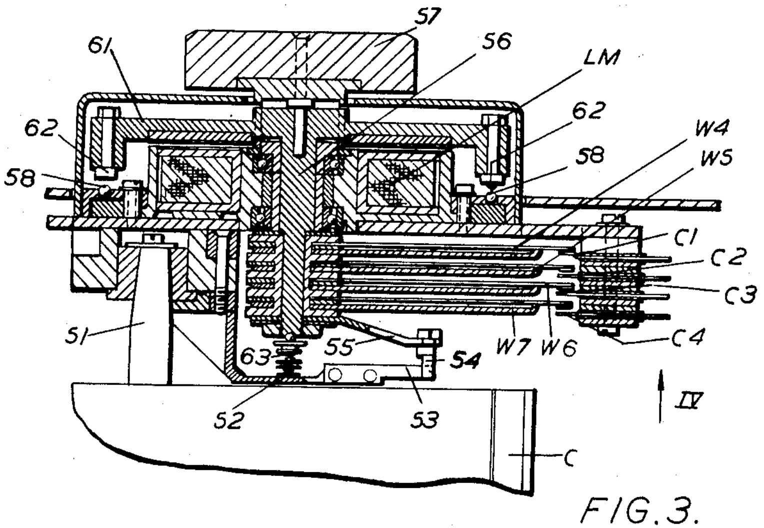
Figure 3 represents a view in section of a rotary, multi-point switch associated with a variable rotary condenser.
Figures 4, 5:
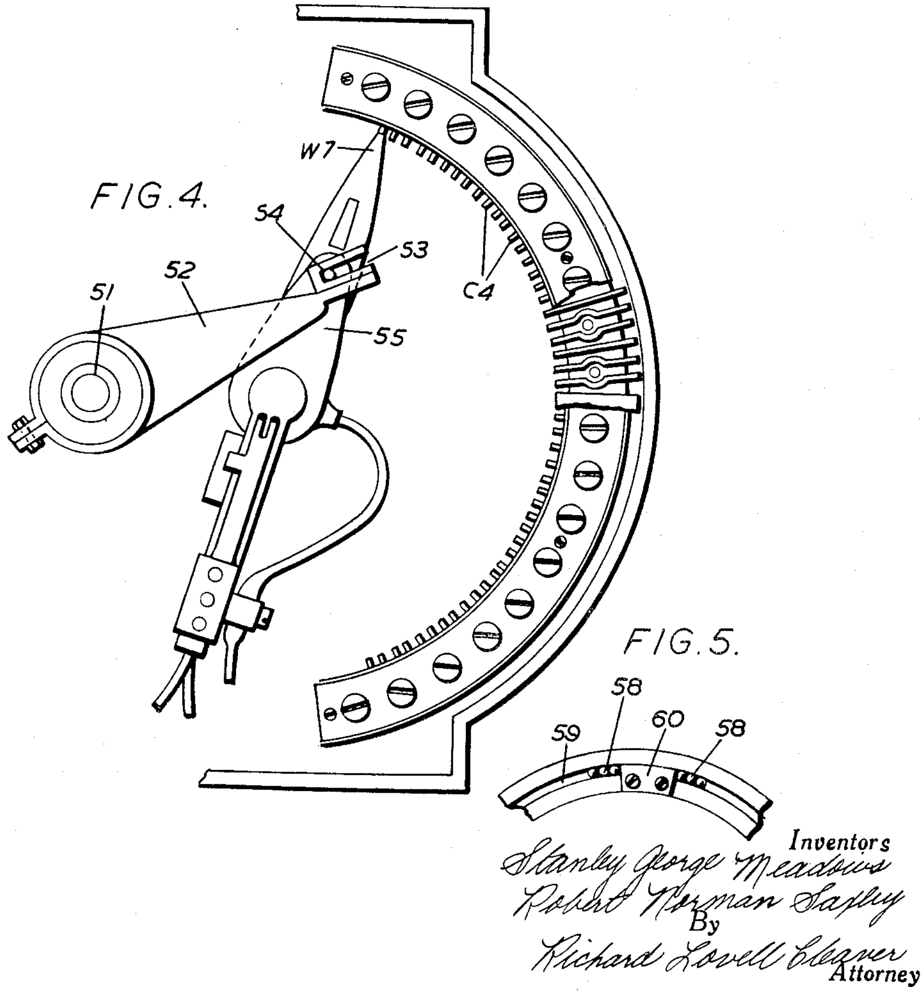
Figure 4 is a view of the arrangement shown in Figure 3 as seen in the direction of the arrow IV in that figure.
Figure 5 is a detail of part of the rotary switch.

The variable condenser C is operated through its connection with a rotary multi-point switch as indicated in Figures 3, 4 and 5. The movable part of the condenser C is fixed to a shaft 51 carrying a radial arm 52. A radial slot 53 in the end of the arm engages a pin 54 on the wiper arm 55 of the switch. The wiper arm 55 is attached to a spindle 56 adapted to be rotated by a handle 57. Also attached to the spindle 56 are four radial wipers W4, W5, W6 and W7 adapted to make contact with four radial levels of fixed contacts C1, C2, C3 and C4. The wipers and levels of contacts are arranged to be out of engagement, with the exception of W4 and C1, during the setting of the switch and to be brought automatically into engagement when the setting has been completed and the recording is to take place. For this purpose the wiper-carrying spindle 56 is adapted for small up-and-down axial movement in relation to the rest of the switch structure. It is normally in the raised position as shown in Figure 3. The downward movement is controlled by an electro-magnet or solenoid LM, the circuit position of which is shown in Figure 6*a*. When the operator closes the key-switch K1, the solenoid LM is energised and all the wipers W5, W6, and W7 are brought into operation. There is a sliding coupling between the knob 57 and the spindle 56, the former not having any axial movement.

It is convenient to use the axial movement of the spindle to ensure central engagement of the wipers and contacts. For this purpose a set of recesses are arranged in an arc about the switch axis. They are provided by a circle of steel balls 58 side by side in a trough 59, accurately located by a stop-plate 60. A diametrically arranged arm 61 fixed to the spindle 56 is provided at the ends with tapering or wedge-shaped pins 62, adapted to be received in the valleys between adjacent balls 58 to guide the switch into the precise position for the central engagement of wipers and contacts. Accordingly, when the key switch K1 is closed for recording to take place, the first action can be the bringing of the wipers W4 and W7 accurately into engagement with their appropriate contacts.

It is convenient to use this axial movement of the spindle to effect closing of a number of other contacts, such as those 63, conveniently located below the end of the spindle. Contacts in this position may perform various controlling actions. The contacts for switches LM1 and LM2 the appropriately placed in this position. The first of these, LM1, by-passes the initiating key switch K1 so that the latter need not be held closed once the recording action has been commenced. The other switch LM2 holds the contacts 2—3 in level T1 connected to earth.

In this example, where it is desired to print a reading consisting of asign and two numerals, in addition to a final cipher and two spaces, four wipers W4, 5, 6 and 7 are employed at the multi-point switch with four levels C1, 2, 3 and 4 of contacts. The first level C1 deals with the sign, and two levels C3 and C4 deal one with each of the columns of numerals. The fourth level C2 is introduced to serve two purposes which will be described hereinafter. In setting the variable condenser C a value may be found on either side of the zero position. On one side it is positive and on the other negative. Accordingly the level C1 for the sign contains two contacts marked −*ve* and +*ve* in Figures 6*b* and 6*c*, each extending over the whole arc of operation on one side of the zero position. Each of the numeral levels C3 and C4 comprises two sets of contacts distributed symmetrically about the zero position and cross-connected so that the same numerals on the two sides are in parallel.

The example is concerned with a multi-point switch, associated with the variable condenser C, giving readings for all integral values between +24 and −24, in conjunction with an additional switch associated with an additional variable condenser CA (Figure 6*a*) adapted to add values in steps of 25 between the limits of +100 and −100. The switches associated with the variable condensers C and CA are used in conjunction with sixteen electro-magnets, such as M in Figure 1, and represented in the circuit shown in Figure 6*b* by M0 to MS. One is provided for each of the numerals 0 to 9, two for the signs +*ve* and −*ve*, one for producing spacing additional to automatic spacing by the typewriter mechanism, and three for the numbers 10, 11 and 12 which are brought into use in conjunction with the use of the additional variable condenser CA.

The first lever C1 of the multi-point switch contacts, contacts of two contacts 1—24, one extending on each side of zero for the whole length of movement of the wiper W4 for the operation of the sign magnets M− and M+. In the simplest arrangement these contacts could be connected directly to the magnets M− and M+, or the connection may be permanently set for one magnet and transferred to the other by the actuation of a relay when the wiper is on the appropriate contact. It may be possible in some cases to dispense with one of the sign contacts with such an arrangement but in many cases it is advantageous to have both contacts to provide for appropriate interlocking security connections. In the arrangement shown in Figure 6*c* the +*ve* contact is connected to a relay A which operates on a switch A1/A2 which is adapted to connect a lead 64 with one or the other of the type magnets M− and M+. In the normal position when relay A is not in operation, wiper W4 being on its appropriate −*ve* contact, switch A1 remains closed to connect lead 64 to M−. When wiper W4 engages the +*ve* contact, relay A operates to close switch A2, and open A1, thus transferring the lead 64 to M+. For the purpose of symmetry, there is connected to the −*ve* side of level C1 a resistance 65 equivalent to the resistance of relay A. The wiper W4 is permanently connected over the lead 50 to the wiper W1 associated with level T1 of the position switch, whereby it is connected to earth during the first three positions of each group.

Figure 6B:
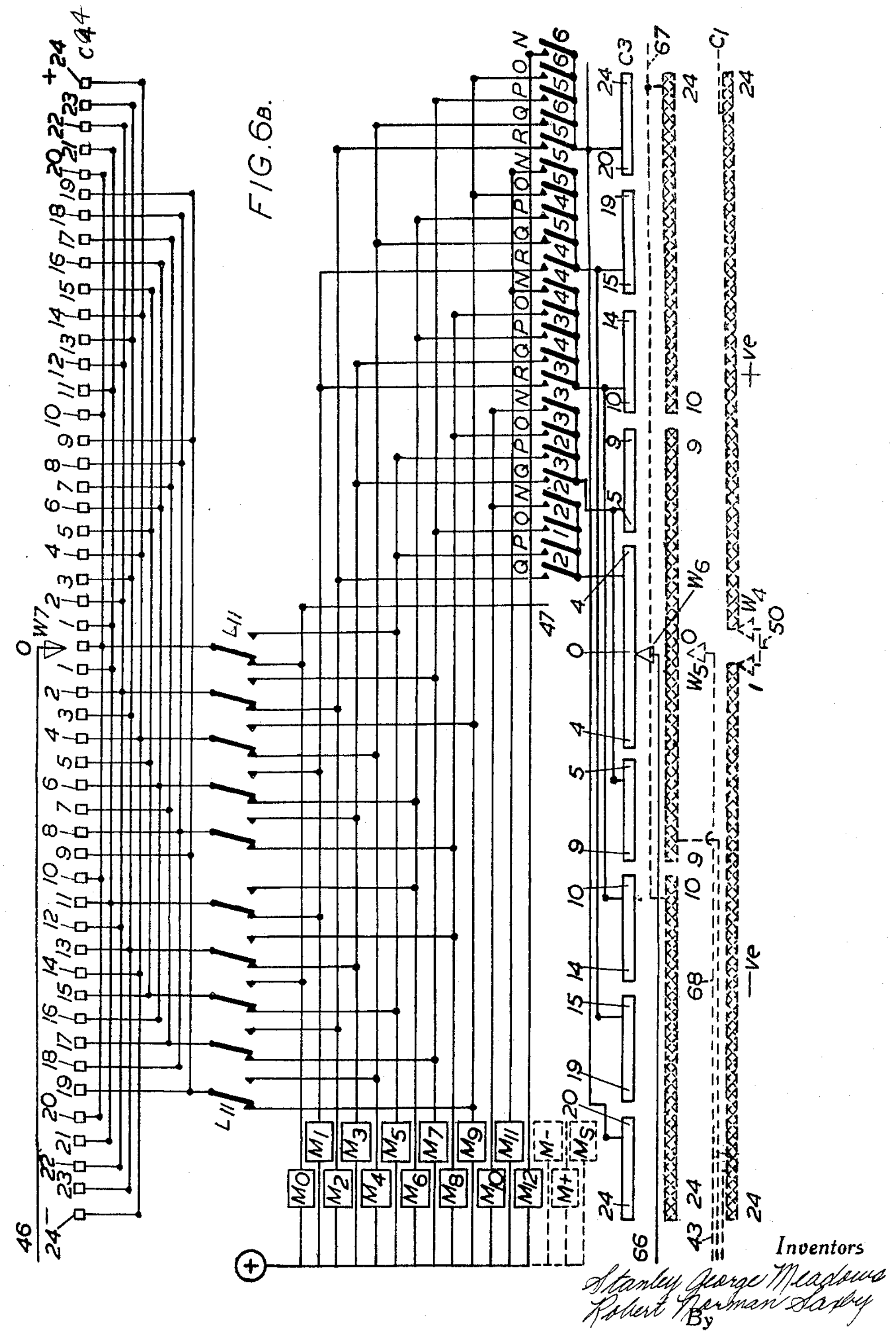

The second level C4 of contacts associated with the multi-point switch consists of a central zero contact and 24 contacts on each side of it, each corresponding to the numerals 1 to 24. All the contacts representing numbers having the same numeral in the units place are connected in parallel as shown in Figure 6*b*. Each group of contacts thus joined together is also normally connected to the circuit for the magnet for actuating the type for this numeral. For example, contacts for +24, +14, +4, −4, −14 and −24 are connected together and to the magnet M4 to actuate type 4. These connections are all made over a bank of switches L11 which are shown in Figure 6*b* in the normal position. The wiper W7 for the contact level C4 is permanently connected over lead 46, see both Figures 6*b* and 6*a*, to all the fourth position contacts in level T3 of the position switch, this being the position in all cases which corresponds to the printing of the units figure.

Figure 6C:
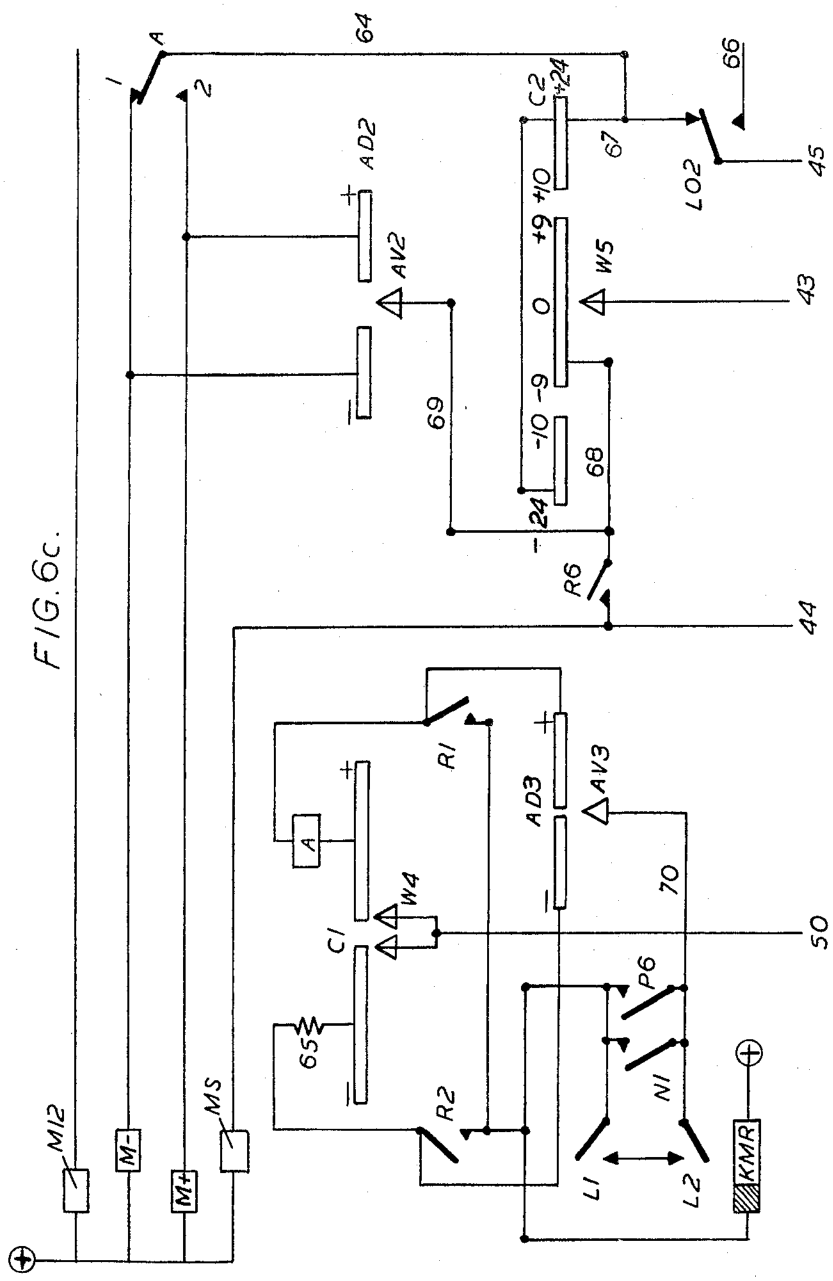

The third level C3 comprises nine contacts arranged as follows: a central contact extending from −4 through central zero to +4 and adapted to be connected to magnets M2, M5, M7 or M10 by closing switches Q2, P1, O2, or N2 respectively; two contacts extending from −9 to −5 and +5 to +9 connected in parallel and adapted to be connected to magnets M3, M5, M8, or M10 over switches Q3, P2, O3 or N3 respectively; two contacts extending over −14 to −10 and +10 to +14 connected together and adapted to be connected to magnets M1, M3, M6, M8 or M11 over switches R3, Q4, P3, O4 or N4 respectively; two contacts covering −19 to −15 and +15 to +19 joined in parallel and adapted to be connected to magnets M1, M4, M6, M9, or M11 over switches R4, Q5, P4, O5 or N5 respectively; and two contacts extending over −24 to −20 and +20 to +24 adapted to be connected to magnets M2, M4, M7, M9 or M12 by switches R5, Q6, P5, O6 or N6 respectively. When the reading to be recorded does not exceed 24, only the switches with prefix R are closed. In this case the contacts covering −9 to +9 are not connected to magnets, since the units figure is to be dealt with from contact level C4; the contacts covering −19 to −10 and +10 to +19 are connected to magnet M1 to print figure 1 in the tens column when the reading does not exceed 19; and contacts covering −24 to −20 and +20 to +24 are connected to magnet M2 to print figure 2 in the tens column. The remaining switches with prefixes Q, P, O and N are brought into operation as afterwards explained when it is required to record readings outside the range of −24 to +24. The wiper W6 for this level is connected over lead 66, see Figures 6*b* and 6*c*, to the lower contact of two-way switch LO2 which in the normal position is closed on the upper contact as shown in Figure 6*c*. The remaining level C2, see Figures 6*b* and 6*c* used for transferring the printing of the sign from the first position in the record to the third position when the record comprises only a units figure. In some types of recording, such as of capacity unbalance in telephone cables, there may be considerable variation in the magnitude of the different readings, so that, while some readings extend into the hundreds column, others do not go beyond the units column.

In such cases it may be desirable to provide in the record evidence that the recording apparatus has worked effectively throughout the range of the three columns when a record figure appears in only one of them. This evidence shows that the absence of the figure in the tens or hundreds place is not due to faulty operation of the apparatus, for instance to some typing action being ineffective. The present invention provides ready means for doing this by an arrangement for moving the position of the sign from the first to a later position, when the reading does not exceed the value 9. Level C2 is for this purpose. It comprises three contacts, one for the range −9 to +9, a second for the range −24 to −10, and a third for the range +10 to +24. The second and third are in parallel and connected over lead 67 (Figures 6*b* and 6*c*) and lead 64 (Figure 6*c*) to one of the sign magnets M+ or M− according to the setting of switch A1/A2. Since the wiper W5 is always connected over lead 43 to the first positions in the position switch level T3, a sign will be printed in the first position when the wiper W5 engages contacts corresponding to values exceeding 9. The central contact −9 to +9 is connected by lead 63 to two alternative positions. In one it is connected to the space magnet MS over a switch R6. Switch R6 is only closed for the recording of values not exceeding 24; under these conditions therefore, for a value between −9 and +9, there will be a circuit from the first positions of the position switch T3 through the wiper W5 to the space magnet MS. Under these same conditions it will be seen that in the third position the appropriate contact of level T3 will connect with one of the sign magnets over lead 45 and the switch A1/A2, switch LO2 being in the upper position as shown in the Figure 6*c*. The other alternative connection of the contact −9 to +9 of level C2 is over a lead 69 to a wiper AV2 of a level of two contacts AD2. As explained hereinafter, the contact level AD2 forms part of a second multi-point switch used for adding steps of twenty-five and the wiper AV2 is centrally spaced between the two contacts in AD2 unless the value to be recorded is greater than 24. The contacts in AD2 are permanently connected to sign magnets M− and M+, and there will be a connection to one of them from the first position of the position switch when the value recorded exceeds 24, and the wiper W5 is on the central contact of level C2. Under these conditions switch R6 remains open.

In the arrangement illustrated in Figure 6*a* there is used an additional variable condenser CA for coarse adjustment in addition to the fine adjustment provided by the first condenser C. The additional condenser CA is associated with a multi-point switch in a manner similar to that described for condenser C. The additional switch is adapted to add steps of the value of 25 between −100 and +100. The introduction of this additional switch makes it convenient to use magnets M10, M11 and M12 to operate special types adapted to print the double figure 10, 11 or 12 at one impression.

Figure 6D:
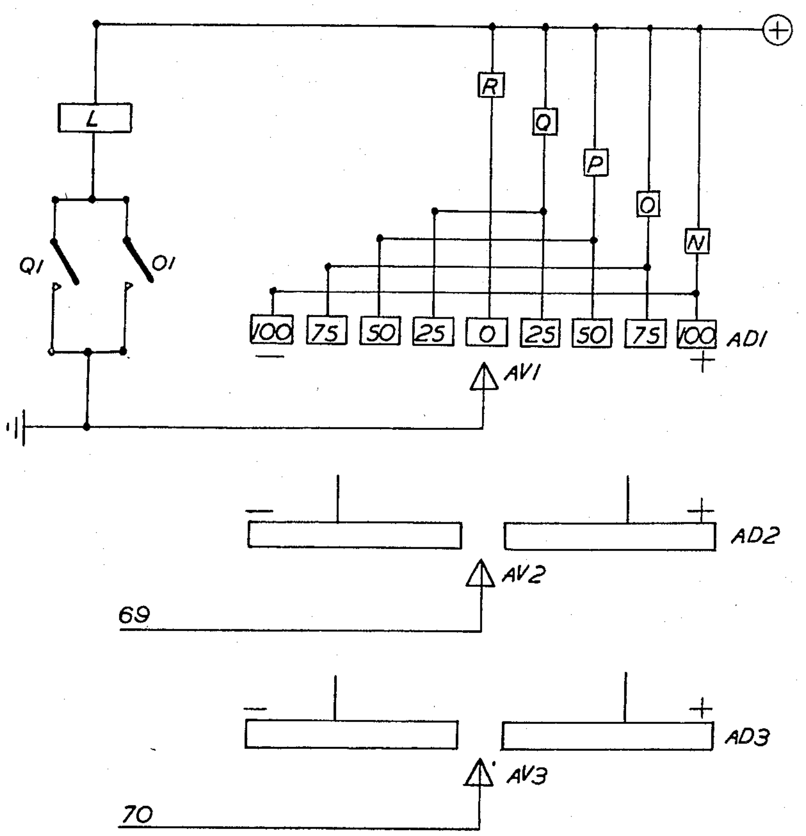

The additional switch has three levels of contacts AD1 to AD3. The first level AD1 comprises the centre zero contact and contacts on each side for the addition of 25, 50, 75 and 100, the contacts of corresponding numerical values being permanently connected in parallel. The associated wiper AV1 is connected to earth, and the contacts 0, 25, 50, 75 and 100 are connected to the supply terminal over relay R, Q, P, O and N respectively. These relays operate as follows. The addition of values 25 and 75 energises relay Q and O respectively, each operating a switch Q1 or O1 in series with a relay L (Figure 6*d*). This alters the circuit connections through each of the bank of switches L11 (Figure 6*b*) in such a way that each contact in the level C4 of the first multi-point switch is connected to a magnet controlling a figure five units higher than the units figure represented by the contact, e. g. 2 to 7, 8 to 3. The addition of the other values 0, 50 and 100 do not affect the units figure. The additional steps 25, 50, 75 and 100 also increase directly the value in the tens column by 2, 5, 7 or 10, and in some cases the value is further increased by the fact that the addition of 5 in the units place causes the carrying over of 1 to the tens place. These additions are taken care of by the previously mentioned relay contacts or switches, operated by the relays R, Q, P, O, and N, and inserted between the contacts of the third level C3 of the multi-point switch and the electro-magnet circuits to transfer the connections to magnets having the appropriate values as shown by the following table:

| Multi-Point Switch Contact in Level C3 | Addition Contact Value | Relay | Relay Contact | To Electromagnet to Print |
|---|---|---|---|---|
| 0 to 4 | 0 | R | | |
| | 25 | Q | Q2 | 2 |
| | 50 | P | P1 | 5 |
| | 75 | O | O2 | 7 |
| | 100 | N | N2 | 10 |
| 5 to 9 | 0 | R | | |
| | 25 | Q | Q3 | 3 |
| | 50 | P | P2 | 5 |
| | 75 | O | O3 | 8 |
| | 100 | N | N3 | 10 |
| 10 to 14 | 0 | R | R3 | 1 |
| | 25 | Q | Q4 | 3 |
| | 50 | P | P3 | 6 |
| | 75 | O | O4 | 8 |
| | 100 | N | N4 | 11 |
| 15 to 19 | 0 | R | R4 | 1 |
| | 25 | Q | Q5 | 4 |
| | 50 | P | P4 | 6 |
| | 75 | O | O5 | 9 |
| | 100 | N | N5 | 11 |
| 20 to 24 | 0 | R | R5 | 2 |
| | 25 | Q | Q6 | 4 |
| | 50 | P | P5 | 7 |
| | 75 | O | O6 | 9 |
| | 100 | N | N6 | 12 |

It will be seen from this table and from the drawings (particularly Figures 6*b* and 6*d*) that when the additional switch lever AD1 is not adding any reading to the fine adjustment, wiper AV1 will be on the central contact, relay R will be in circuit and all contacts corresponding to relay R closed; the contacts for values exceeding 9 in multi-point switch level C3 will be in circuit with the magnets corresponding to the tens column figures of those values; and the contacts for values of 9 and under will be unconnected with any magnets since they are to be dealt with from level C4 through switches L11. When the wiper AV1 engages any other contact in level AD1 one of the relays N, O, P and Q will have closed the appropriate switches to divert the circuits from all contacts in level C3 to magnets of an appropriately higher value. In addition, when values of 25 or 75 are added, the operation of relay Q or O will cause the switches L11 to change, through the action of switches Q1 or O1 and relay L, to add 5 to the units values of the contacts in position switch level C4.

In association with the additional multi-point switch there are two other levels of contacts, indicated in Figures 6*c* and 6*d* as AD2 and AD3 with wipers AV2 and AV3 respectively. Each level AD2 and AD3 comprises two contacts extending one on each side of a central blank position. All the wipers AV1, AV2 and AV3 are mechanically coupled to the movable member of the additional variable condenser to move in unison, so that wipers AV2 and AV3 will not be on contacts when wiper AV1 engages the zero contact in level AD1. The contacts in levels AD2 and AD3 are appropriately associated with *—ve* and *+ve* signs. The contacts of level AD2 are permanently connected with magnets M— and M+. When the additional switch introduces a value of 25 or over, wiper AV2 will be on one of the appropriate contacts in AD2, and this will cause a sign to be printed in the first position if wiper W5 engages a contact of value less than 10 in level C2 (this being a condition in which a space would have been printed through R6 had the additional switch been making no addition to the reading). The remaining level of contacts in level AD3 are used to ensure that no record can be made when the two variable condensers C and CA with their appropriate multi-point switches are set in positions representing quantities of different sign. The contacts AD3 come into circuit only when the additional switch level AD1 is in position to add at least 25 to the reading, in which case one of the switches L1/L2, N1 and P6 (Figure 6*c*) will be closed, and switches R1 and R2 will be open. Under these circumstances, one of two circuits must be made from lead 50 if the recording is to be effected. In the first position lead 50 is connected to earth through wiper W1 and a first contact in level T1 of the position switch. The first circuit from lead 50 comprises wiper W4, *—ve* contact in level C1, resistor 65, *—ve* contact in level AD3, wiper AV3, and one of switches L1/L2, N1 and P6 to relay KMR. The second circuit differs from the first by the inclusion of the *+ve* contacts in levels C1 and AD3 in place of the *—ve* contacts and relay A in place of resistor 65. Clearly if wiper W4 is on a contact of different sign from the contact engaged by wiper AV3, neither of these circuits will be complete and relay KMR will not be energised. Since relay KMR is the print key switch release, the print key switch cannot in these circumstances be closed and the recording cannot be initiated.

Before giving examples illustrating the different types of records which may be made, the remaining relays will be described.

The print switch release relay KMR has been referred to above. When operated it serves to close switch KMR1 which makes direct connection from the print switch K1 to earth and removes a locking bar LB from a position in which it prevents closure of the print switch.

Relay LM is the solenoid which, as indicated with reference to Figure 3, pulls the wipers C2, C3 and C4 into engagement with their appropriate contact levels in the multi-point switch when the print switch K1 is closed. This movement closes switch LM1 which by-passes the print switch K1 and thus maintains relay LM in circuit when the print switch is released. This relay also closes LM2 which joins the contacts 2—3 of level T1 of the position switch to earth. Switch LM2 also completes a circuit to earth from a relay SA through the switch 22/23. The relay LM is not released until the recording operation is completed. During the 2nd to the 6th positions relay LM is in circuit through contacts 2—6 in level T2, but at the end of a recording, when in the first position wiper W2 meets a space in level T2, the circuit to LM is broken and the operation ceases until the print switch K1 is again closed. The locking relay KMR however is retained in operation over three positions, that is until, in the fourth position, the wiper W1 breaks contact with level T1. It will be seen that the operation can proceed through the 2nd to 6th positions of each record without the print switch K1 being maintained depressed. It will also be seen that the recording operation will not be interrupted by moving the wiper 41 into the next contact of the selector switch after the print switch K1 has been closed. Also should the position of the position switch not coincide with the position of wiper 41 in the selector switch, there will be a break in the circuit to the relay KMR since wiper W1 will be in the wrong position, and the print switch K1 will remain locked against operation.

The slugged relay SA controls switch SA1 in the circuit to the wiper W3 engaging the contacts in the main position switch level contacts T3. The current to operate all the magnets M1, etc., is derived through switch SA1. In series with SA is the switch 22/23 which, as explained above, is opened as each printing operation occurs; this de-energises SA, causes SA1 to open, de-energises the appropriate print magnet, and permits the associated type lever to return. The carriage now moves through one space automatically and switch 22/23 recloses to permit the next printing operation to take place. When relay LM is de-energised as the wiper W2 reaches a space corresponding to the first position of the next group, switch LM2 opens and relay SA cannot be re-energised without again closing the print switch K1.

Relay LO serves to divert the connection from the third position over lead 45 to a sign magnet, to the wiper W6 of level C3 by moving switch LO2 into the lower position in Figure 6*c* as a sign is printed in the first position. Each movable armature of the sign magnets is adapted to engage one of two switches shown diagrammatically in Figure 6*a* as M—1 and M+1, causing it to close momentarily and to open when the magnet is released. Switches M—1 and M+1 are in parallel in the circuit to relay LO. When therefore a sign is printed in the first position, relay LO is energised, and switch LO1, in parallel with M—1 and M+1, is closed to retain relay LO energised. At the same time switch LO2 is moved to the lower position. After the third position, relay LO is released by the wiper W1 coming opposite a space in level T1 of the position switch.

The remaining relays shown in the drawing have been described earlier in the specification.

The manner in which records are printed will be described with reference to typical examples, the appropriate circuits being indicated. In each case it is assumed that the operator has adjusted the variable condenser or condensers to measure the capacity indicated 35 in Figure 6*a*, the selector switch wiper 41 being on the left hand contact 42, and the position switch being set correspondingly for the first position in the left hand group. The operator, having obtained the required setting of the measuring bridge, by manipulation of condensers C and CA, closes the print switch K1. The appropriate circuit is then established as described above, to cause the appropriate magnet to effect the first printing operation. This is followed automatically by a movement of the record sheet carrier through one position. The printing and movement is repeated until after the final "space" is printed the apparatus is set and halted in position for commencing the next recording operation. The examples given below summarise the kind of results obtained.

A. *Reading —9*

1. "Space" by MS, over lead 43, wiper W5, lead 68 and switch R6.

2. "Space" by MS, over lead 44.
3. "—" by M—, over lead 45, switch LO2 as shown, lead 64 and switch A1.
4. "9" by M9, over lead 46, wiper W7, contact —9 and switch L11 as shown.
5. "0" by M0, over lead 47. (Figure 0 is always printed in this position in the present illustration, to represent the first decimal place and indicate the degree of accuracy.)
6. "Space" by MS over lead 44.

The record thus printed is "—90."

B. *Reading +23*

1. "+" by M+, over lead 43, wiper W5, leads 67 and 64 and switch A2.
2. "Space" by MS (see Example A).
3. "2" by M2 over lead 45, switch LO2 in bottom position, wiper W6 and switch R5.
4. "3" by M3 over lead 46, wiper W7, contact +23 and switch L11 as shown.
5. "0" by M0 (see Example A).
6. "Space" by MS (see Example A).

The record thus printed is "+230."

C. *Reading —34 (i. e. —9 with —25 additional)*

1. "—" by M—, over lead 43, wiper W5, lead 68 and 69, wiper AV2 and —*ve* contact of level AD2.
2. "Space" (see Example A).
3. "3" by M3, over lead 45, switch LO2 in lower position, wiper 6 and switch Q3.
4. "4" by M4, over lead 46, wiper W7, contact —9 and switch L11 closed on right hand contact.
5. "0" (see Example A).
6. "Space" (see Example A).

The record obtained is thus "—340."

D. *Reading +103 (i. e. +3 with +100 additional)*

1. "+" by M+ over lead 43, wiper W5, leads 68 and 69, wiper AV2 and +*ve* contact of level AD2.
2. "Space" (to be afterwards filled) (see Example A).
3. "10" (the tens figure to occupy the second position) by M10 over lead 45, switch LO2 in lower position, lead 66, wiper W6 and switch N2.
4. "3" by M3 over lead 46, wiper W7, contact +3 and switch L11 as shown.
5. "0" (see Example A).
6. "Space" (see Example A).

The record thus obtained is "+1030."

It is not intended to restrict the invention to the particular form which has been described above merely by way of example. While the multi-point switch is conveniently of the rotary type it may be of any other form in which a number of contacts may be engaged singly or in groups by a contact device movable relative thereto. The rotary arrangement is particularly applicable where the setting is arrived at by a balancing operation resulting from switching elements into and out of circuit or adjusting the value of a variable element such as a capacitor or resistor. The rotary switch or group may be hand or mechanically-operated and may be connected with the capacitor, resistor or other circuit adjusting device, either directly or through mechanical gearing, the use of two or more switches, or two or more instruments, has been described for the case where in arriving at a balance one switch produces a fine adjustment and the other a coarse adjustment in steps each exceeding by one the full range of the first. It may also be used where the reading of more than one instrument is to be recorded in succession, or a number of indicators on a single instrument, such as a multi-dial integrating meter. In such cases the several switches will be provided with one or more levels of contacts and the appropriate wiper or wipers, these being connected with the appropriate position contacts on the typing device. An arrangement for a balancing adjustment which may be convenient in some cases is to make the multi-position switch deal with the units column of the reading and the additional switch with the tens column, then the numeral contacts for the same numerical value on the two switches will be connected with the same electro-mechanical type-controlling device and each will be brought into operation in the appropriate column on the record by the corresponding contact on the position switch of the typing device. In some cases, as in the example described, however, an alternative method may be adopted in which the multi-point switch deals with a larger range of figures than 10 and the additional switch has corresponding larger steps. Such an arrangement may be conducive to convenient operation in searching for a balance, since it gives a larger range of adjustment to the multi-point switch permitting in many cases a balance to be arrived at without bringing the additional switch into action.

In addition to the levels of contacts in the various switches as already described, others may be provided for performing other functions.

The type-actuating magnets may be made self-releasing at the completion of the printing stroke, instead of being released by the action of the movement of some part of the typing device, such as the type lever, on approaching the end or completing its stroke.

What we claim as our invention is:

1. A record-printer for typing the result of the reading of an instrument in the form of figures in appropriate positions across a record sheet, the figures being produced one at a time in a typing position, the said record-printer comprising typing members, a number of electrically controlled type-member-operating means, a record sheet carrier movable relative to the typing member, a feeding-movement-producing means for the carrier, an escapement for releasing the carrier one step at a time, a multi-point switch adapted to make circuit connections in accordance with each reading, a position switch actuated by the carrier, said position switch comprising a fixed array of contacts and a wiper mounted on and movable with said carrier to make circuit connections with said array in each typing position of the carrier, and a type-member actuating circuit established through said multi-point switch and said position switch in each typing position of the carrier.

2. A record-printer for typing the result of the reading of an instrument in the form of figures in appropriate positions across a record sheet, the figures being produced one at a time in a typing position, the said record-printer comprising typing members, a number of electrically controlled type-member-operating means, a record sheet carrier movable relative to the typing members, feeding-movement-producing means for the carrier, an escapement for releasing the carrier one step at a time, a multi-point switch adapted to make circuit connections in accordance with each reading, a line of contacts fixed in relation to the typing members, a wiper contact mounted on and movable with the carrier to engage the said line of contacts one at a time, said line of contacts comprising one for each typing position across the record sheet, said wiper and line of contacts adapted to make circuit connections in accordance with each typing position of the carrier, and a type-member actuating circuit established through said multi-point switch on the one hand and the wiper and line of contacts on the other hand in each typing position of the carrier.

3. A record-printer for typing the result of a reading of an instrument as a group of figures in appropriate positions across a record sheet, the figures being produced one at a time in a typing position, the said record-printer comprising typing members, a number of electrically controlled type-member-operating means, a record sheet carrier movable relative to the typing members, step-by-step feeding movement producing means for the carrier, an escapement adapted to release the carrier for movement through one step after each printing operation, a multi-point switch adapted to make circuit connections in accordance with each reading, a position switch actuated by said carrier, said position switch comprising an array of contacts fixed in relation to the typing members and a wiper mounted on and movable with the carrier to alter the circuit connections of the position switch at each movement of the carrier, a type-member actuating circuit established through the multi-point switch and the position switch in each typing position of the carrier, escapement-actuating means adapted to operate with each printing operation, to interrupt one type-member-actuating circuit and to complete the next such circuit, and a printing switch to initiate completion of the type-member-actuating circuit for the first figure of a group and such subsequent circuits as are required to print the remaining figures of the group.

4. A record-printer for typing the result of a reading of an instrument as a group of figures in positions across a record sheet, the figures being produced one at a time in a typing position, said record printer comprising typing members, a number of electrically controlled type-member-operating means, a record carrier movable relative to the typing means, step-by-step feeding movement producing means for the carrier, a multi-point switch to be set for each reading, said multi-point switch containing more than one bank of contacts and corresponding wipers adapted to engage each bank of contacts, each of said banks of contacts being associated with one of the positions in the record, a position switch actuated by the carrier, said position switch comprising an array of fixed contacts and a wiper mounted on said carrier to make with said fixed contacts circuit connections in each typing position of the carrier, a type-member actuating circuit established through the multi-point switch and the position switch in each typing position of the carrier, and the appropriate circuits from the multi-point switch being completed in succession by the movement of the carrier.

5. A record-printer for typing the result of the reading of an instrument as several figures in positions across a record sheet, said record-printer comprising a typing device with electrically controlled type-operating means, a carrier movable step-by-step through a typing position, a multipoint switch adapted to be set for each reading and containing several banks of contacts each engageable by a separate wiper and each adapted for printing in a different position in the record, one of said banks of contacts having a negative and a positive contact and being adapted to select a circuit for printing an appropriate sign in accordance with the sign of the reading, a position switch comprising an array of fixed contacts and a wiper mounted on said carrier to be moved thereby over said array of contacts to alter the circuit connections through the position switch with each movement of the carrier, and a type-member actuating circuit established through the multi-point switch and the position switch to establish conditions for actuation of an appropriate typing member in each position of the carrier.

6. A record-printer as in claim 5, the multi-point switch including a further level of contacts and a wiper contact engageable therewith, said wiper and contacts being adapted to be included in the circuit connections from each first position of the position switch, and means adapted to divert circuits from the fixed contacts in the first and third positions of the position switch to print a sign in the third position in a record where that record involves no significant figures in the second and third positions.

7. A record-printer for typing the result of an instrument reading as figures across a record sheet, comprising electrically controlled type-operating means, a carrier movable step-by-step through a typing position, a multipoint switch adapted to be set for each reading, said multipoint switch containing more than one bank of contacts engageable by a wiper contact, one of said banks comprising a positive and a negative contact extending one on each side of a central zero position, duplicate sets of contacts in each of the other banks extending one on each side of the central zero position, permanent connections between those contacts in each bank which are associated with the same type-member, a position switch for actuation by the carrier, said position switch comprising an array of fixed contacts and a wiper mounted on and movable with the carrier, and a type-member actuating circuit established through the multi-point switch and position switch in each position of the carrier to establish conditions for actuation of an appropriate typing member.

8. A record-printer for typing the result of the reading of an instrument in the form of figures across a record sheet, comprising electrically controlled type-operating means, a carrier movable step-by-step through a typing position, two multi-point switches adapted to be set for each reading, a position switch actuated by the carrier, said position switch comprising an array of fixed contacts and a wiper mounted on and movable with the carrier, a type-member actuating circuit made by the multi-point switches and position switch in each position of the carrier to establish conditions for actuation of an appropriate typing member, one of said multi-point switches being adapted for fine adjustment and the other for coarse adjustment, and relays associated with the coarse adjustment switch adapted to modify connections between the fine adjustment switch and the type-operating means in accordance with the setting of the coarse adjustment switch.

9. A record-printer as in claim 8, comprising two levels of contacts in the coarse adjustment switch, one of said levels comprising a centre zone contact and contacts on each side of zero of numerical values having positive and negative sign, the other of said levels comprising two contacts extending one on each side of a central position over the whole range of adjustment, and circuit connections completing conditions appropriate for recording when wipers engage contacts of the same sign in each level of the two multi-point switches.

10. A record printing device for typing the result of the reading of an instrument in the form of one or more figures in appropriate positions across a record sheet, consisting of a typewriter, electro-mechanical devices operatively connected with appropriate type levers and the spacer bar, a position switch comprising a row of contacts fixed to the typewriter frame and a wiper mounted on and movable with the typewriter carriage, and a multi-point switch adapted to be set for each reading, a type-member actuating circuit made by the multi-point switch and the position switch in each pair of associated positions of the switches, and a switch operatively associated with the spacer mechanism to momentarily interrupt the circuit to the appropriate electro-mechanical device at each typing operation.

11. A record printing device for typing the result of the reading of an instrument as several figures in positions across a record sheet, consisting of electrically controlled typing means, a carrier movable step-by-step through a typing position, a multi-point switch to be set for each reading and containing several contact levels each engageable by a separate wiper and adapted for printing in a different position in the record, a position switch actuated by the carrier, said position switch comprising an array of fixed contacts and a wiper fixed to and movable with said carrier to change the position switch connections with each movement of the carrier so that the circuit connections for each pair of associated positions of both switches establish conditions for actuation of an appropriate type member at the typing position, some of the wipers in the multi-point switch adapted to be normally out of engagement with the corresponding level, an electro-mechanical device adapted to move all the wipers into engagement with the levels, and the electro-mechanical device being associated with a printing switch to operate when the multi-point switch has been set in the required position.

References Cited in the file of this patent

UNITED STATES PATENTS 2,217,150 Ayers ------------------ Oct. 8, 1940

2,313,752 Le Clair -------------- Mar. 16, 1943

2,403,006 Lake et al. -------------- July 2, 1946

2,439,497 Tholstrup -------------- Apr. 13, 1948

2,493,709 Wittenmyer ------------ Jan. 3, 1950